(12) United States Patent
Liu

(10) Patent No.: US 12,086,093 B2
(45) Date of Patent: Sep. 10, 2024

(54) SERIAL PORT CONTROL SYSTEM BASED ON COMPLEX PROGRAMMABLE LOGIC DEVICE (CPLD) AND COMMUNICATION METHOD THEREFOR

(71) Applicant: DONGGUAN HUABEL ELECTRONIC TECHNOLOGY CO., LTD., Guangdong (CN)

(72) Inventor: Gang Liu, Guangdong (CN)

(73) Assignee: DONGGUAN HUABEL ELECTRONIC TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/569,727

(22) PCT Filed: Nov. 9, 2021

(86) PCT No.: PCT/CN2021/129522
§ 371 (c)(1),
(2) Date: Dec. 13, 2023

(87) PCT Pub. No.: WO2022/267303
PCT Pub. Date: Dec. 29, 2022

(65) Prior Publication Data
US 2024/0273053 A1 Aug. 15, 2024

(30) Foreign Application Priority Data
Jun. 22, 2021 (CN) .......................... 202110694686.9

(51) Int. Cl.
*G06F 13/42* (2006.01)
(52) U.S. Cl.
CPC .. *G06F 13/4282* (2013.01); *G06F 2213/0002* (2013.01)
(58) Field of Classification Search
CPC .................. G06F 13/4282; G06F 2213/0002
See application file for complete search history.

(56) References Cited

U.S. PATENT DOCUMENTS

2016/0055106 A1* 2/2016 Ansari ................... G06F 13/24
710/266
2016/0216330 A1* 7/2016 Lenka ............ G01R 31/318516
(Continued)

FOREIGN PATENT DOCUMENTS

| CN | 105243039 A | 1/2016 |
|---|---|---|
| CN | 107145464 A | 9/2017 |

(Continued)

OTHER PUBLICATIONS

International Search Report for PCT/CN2021/129522 mailed on Mar. 23, 2022.

(Continued)

*Primary Examiner* — Henry Tsai
*Assistant Examiner* — Harry Z Wang
(74) *Attorney, Agent, or Firm* — The PL Law Group, PLLC

(57) ABSTRACT

A serial port control system based on a complex programmable logic device (CPLD) includes a console, a plurality of processors, and a CPLD between the console and the plurality of processors. The CPLD includes a controller and a register. The console is configured to transmit an instruction including a register address and a register content of a serial port of a corresponding processor to the controller which parses the instruction to obtain the corresponding register address and register content and write them to the register; and the controller is configured to communicate with the serial port of the corresponding processor according to the register address and the register content. The controller and the register within the CPLD can automatically switch the serial port to communicate with the corresponding processor, thereby improving the efficiency.

9 Claims, 3 Drawing Sheets

(56) References Cited

U.S. PATENT DOCUMENTS

| | | | |
|---|---|---|---|
| 2018/0067794 A1* | 3/2018 | Datta | G06F 11/2215 |
| 2019/0155367 A1* | 5/2019 | Rao | G06F 30/3312 |
| 2019/0370482 A1* | 12/2019 | Harland | G06F 9/4401 |
| 2020/0379860 A1 | 12/2020 | Zhou | |
| 2022/0398148 A1* | 12/2022 | Sheshagiri Naik | G06F 11/0772 |

FOREIGN PATENT DOCUMENTS

| | | |
|---|---|---|
| CN | 109558369 A | 4/2019 |
| CN | 109857685 A | 6/2019 |
| CN | 113377701 A | 9/2021 |

OTHER PUBLICATIONS

Office action issued on Jul. 29, 2022 from China Patent Office in a counterpart China Patent Application No. 202110694686.9 (all the cited references are listed in this IDS.) (English translation is also submitted herewith.).

* cited by examiner

SERIAL PORT CONTROL SYSTEM BASED ON COMPLEX PROGRAMMABLE LOGIC DEVICE (CPLD) AND COMMUNICATION METHOD THEREFOR

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2021/129522 filed on Nov. 9, 2021, which claims priority to the benefit of Chinese Patent Application No. 202110694686.9 filed in the Chinese Intellectual Property Office on Jun. 22, 2021, the entire contents of which are incorporated herein by reference.

BACKGROUND

1. Technical Field

The present application relates to the technical field of switch and server hardware design, and particularly relates to a serial port control system based on a complex programmable logic device (CPLD) and a communication method thereof.

2. Background Art

Current server or switch system designs typically include a plurality of processors, such as an X86 processor, a baseboard management controller (BMC), and other devices with a UART interface, such as a complex programmable logic device (CPLD), a field-programmable gate array (FPGA), and the like. At present, these ports are typically connected to a console by means of a debug header, which requires manual intervention. For example, connector debugging has to be performed manually after shutdown, and for different processors, debugging has to be switched for multiple times, which is complex and has low switching efficiency.

SUMMARY

The present application discloses a serial port control system based on a complex programmable logic device (CPLD), including a console, a plurality of processors, and a CPLD between the console and the plurality of processors, the CPLD including a controller and a register.

The console is configured to transmit an instruction including a register address and a register content of a serial port of a corresponding processor to the controller:
the controller is configured to parse the instruction to obtain the corresponding register address and register content and write the corresponding register address and register content to the register; and
the controller is configured to communicate with the serial port of the corresponding processor according to the register address and the register content.

Optionally, the controller is further configured to modify a serial port mode parameter of the CPLD according to a serial port mode parameter of the corresponding processor.

Optionally, the serial port mode parameter includes a baud rate and/or a check bit.

Optionally, the console is further configured to read state information of the register.

Optionally, the state information includes a state machine and a state parameter.

Optionally, the controller is configured to communicate with the corresponding processor according to configuration of the register, to obtain state information returned from the processor.

Optionally, the controller is configured to obtain the state information from the processor at a preset time interval.

Optionally, the register is configured by the console and/or the processors.

Optionally, information transmitted from one of the processors is transmitted to another of the processors through a serial port group of the CPLD.

The present application further provides a communication method for the serial port control system based on a complex programmable logic device (CPLD) as described above, including:
transmitting, by the console, an instruction to the controller;
parsing the instruction by the controller to obtain the corresponding register address and register content and write the corresponding register address and register content to the register; and
communicating with the serial port of the corresponding processor by the controller according to the register address and the register content.

In the present application, a controller and a register are provided in the CPLD, and during use, the console transmits an instruction to the controller which then parses the received instruction to obtain the corresponding register address and register content and write the corresponding register address and register content to the register, and finally, the controller communicates with the corresponding processor according to the register address and the register content. Therefore, by means of the controller and the register of the CPLD, the present application can automatically switch the serial port to communicate with the corresponding processor, thereby improving the efficiency.

DETAIL DESCRIPTION OF THE INVENTION

In order to explain the technical contents, structural features, implementation principles, and objects and effects of the present application in detail, the following description is made in conjunction with the accompanying drawings.

Figure 1:
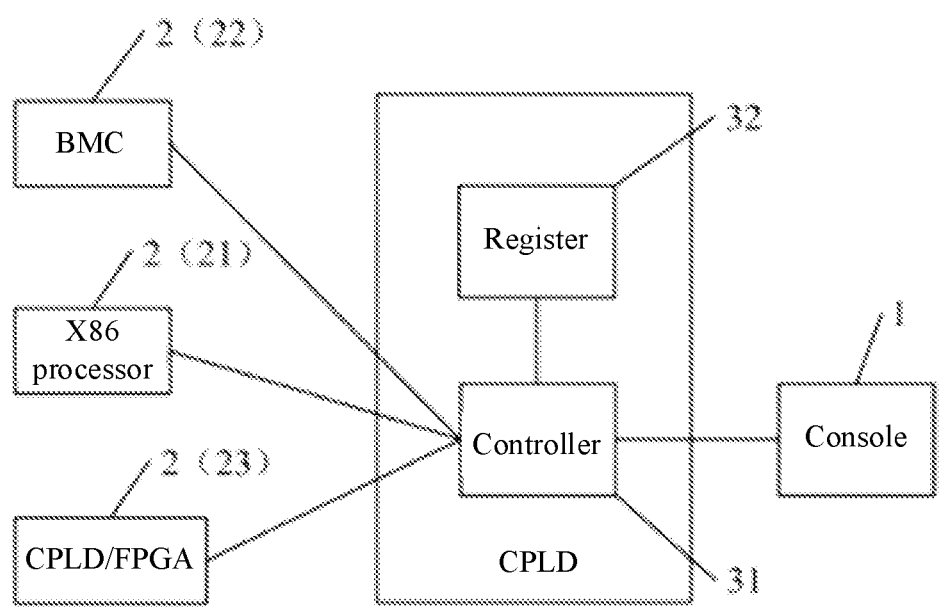
FIG. 1 is a schematic structural diagram of a serial port control system based on a CPLD according to an embodiment of the present application.

Referring to FIG. 1, an embodiment of the present application discloses a serial port control system based on a complex programmable logic device (CPLD), including a console 1, a plurality of processors 2, and a CPLD between the console 1 and the plurality of processors 2. The CPLD includes a controller 31 and a register 32. The console 1 is configured to transmit an instruction including a register address and a register content of a serial port of a corresponding processor 2 to the controller 31. The controller 31 is configured to parse the instruction to obtain the corresponding register address and register content and write the corresponding register address and register content to the register 32. The controller 31 is configured to communicate with the serial port of the corresponding processor 2 according to the register address and the register content.

In the present application, a controller 31 and a register 32 are provided in the CPLD, and during use, the console 1 transmits an instruction to the controller 31 which then parses the received instruction to obtain the corresponding register address and register content and write the corresponding register address and register content to the register 32, and finally, the controller 31 communicates with the corresponding processor 2 according to the register address and the register content. Therefore, by means of the controller 31 and the register 32 of the CPLD, the present application can automatically switch the serial port to communicate with the corresponding processor 2, thereby improving the efficiency.

Specifically, the console 1 is connected to the CPLD through a serial port interface, and the plurality of processors 2 are connected to the CPLD through respective serial ports. Preferably, the plurality of processors 2 may include an X86 processor 21, a BMC 22, and various other devices with a UART interface, such as a CPLD/FPGA 23. The serial port interface is a UART interface, and the console 1 is connected to the CPLD through an RS-232C standard interface. Apparently, the serial port interface may have other specific forms, which is not limited here.

During use of the serial port control system based on a CPLD of the present application, the console 1 transmits an instruction to the controller 31 of the CPLD through the serial port interface. The controller 31 then parses the instruction to obtain a serial port address and register content of a serial port corresponding to the instruction and writes the serial port address and the register content to the register 32, where the register address refers to a serial port address of the corresponding processor 2, for example, a serial port address of the X86 processor 21 or the BMC 22. The register content refers to a content communicated with the corresponding processor 2, such as actions and functions to be performed, and data to be transferred. Apparently, an instruction may include one or more register addresses and one or more register contents. Finally, the controller 31 communicates with the serial port of the corresponding processor 2 according to the register address and the register content.

In some embodiments, the controller 31 is further configured to modify a serial port mode parameter of the CPLD according to a serial port mode parameter of the corresponding processor 2.

By means of the above technical means, communication between the controller 31 and processors 2 with different serial port mode parameters is facilitated, thereby improving applicability of the system.

Specifically, the serial port mode parameters of the processors 2 may differ, and therefore, the controller 31 first obtains the serial port mode parameter of a processor 2 for communication, and then modifies the serial port mode parameter of the CPLD according to the obtained serial port mode parameter, so that the serial port mode parameter of the CPLD is matched with the serial port mode parameter of the processor 2 for communication.

Further, the serial port mode parameter includes, but is not limited to, a baud rate and/or a check bit.

Specifically, the serial port mode parameter may include only a baud rate, and since the baud rate is an index for measuring a data transfer rate, and serial ports in communication with each other should have the same baud rate, normal communication between the controller 31 and the serial port of the corresponding processor 2 is facilitated by modifying the baud rate of the CPLD to be the same as that of the processor 2 for communication. In addition, the serial port mode parameter may include only a check bit, and correctness of data transfer can be verified by distinguishing the check bit. Apparently, the serial port mode parameter may include both a baud rate and a check bit, which is not limited herein.

With such arrangement, normal communication with processors 2 having different serial port mode parameters is enabled without modifying hardware of the system.

In some embodiments, the console 1 is further configured to read state information of the register 32. In this manner, state information of the CPLD can be obtained in time, so that the operation condition of the CPLD can be learned clearly, and monitoring and later-stage debugging are facilitated.

Specifically, the console 1 obtains the state information of the register 32 of the CPLD through the serial port.

Further, the state information includes a state machine and a state parameter. The state machine can feed back an operation flow of the CPLD, and the state parameter refers to data of the CPLD in each state during operation.

In some embodiments, the controller 31 is configured to communicate with the corresponding processor 2 according to configuration of the register 32, to obtain state information returned from the processor 2.

By means of the above technical means, state information of each processor 2 can be obtained in time, and monitoring and debugging of each processor 2 are facilitated.

Further, the controller 31 is configured to obtain the state information from the processor 2 at a preset time interval.

Specifically, the controller 31 may communicate with one or more processors 2 at a preset time interval, where a specific value of the preset time interval may be set on the CPLD, which is not limited herein. During operation, the register 32 is configured with information of a processor 2 to be monitored, the controller 31 transmits an instruction to the processor 2 to be monitored through a serial port of the CPLD according to configuration information of the register 32, and after receiving the instruction, the processor 2 to be monitored returns state information of the processor 2 to the CPLD, which is beneficial for the CPLD to obtain state information of each processor 2. The above process does not need intervention of the console 1, and the processor 2 to be monitored does not involve any extra process, thereby reducing the workload of the processor 2. In addition, After obtaining the state information of the corresponding processor 2, the CPLD may analyze the obtained state information, and then give a corresponding action instruction, such as shutdown, restart, or reporting an interrupt, or the like.

In some embodiments, the register 32 is configured by the console 1 and/or the processors 2.

The register 32 configured in various ways can improve convenience of the system and enrich functions of the system.

Specifically, the register 32 may be configured by the console 1 only. For example, the register 32 may be configured by the console 1 transmitting an instruction through a serial port. The register 32 may be configured by the processors 2 only. The processors 2 may configure the register 32 by means of I2C, LPC, or the like, which may exclude intervention of the console 1. Apparently, the register 32 may be configured by both the console 1 and the processors 2, which is not limited here.

The specific configuration of the register 32 includes at least one of:

(1) configuring an operating mode, where the controller 31 switches to a corresponding serial port communication mode according to an operating mode configured by the register 32;

(2) configuring a serial port mode parameter, where the controller 31 modifies the serial port mode parameter of the CPLD according to the serial port mode parameter configured by the register 32;

(3) configuring a function of reading state information of the register 32, where the controller 31 reads state information of the register 32 according to a function of reading the state information configured by the register 32; or (4) configuring a function of obtaining state information of the processors 2, where the controller 31 obtains state information of each processor 2 according to the function of acquiring state information of the processors 2 configured by the register 32.

Apparently, the configuration of the register 32 is not limited to the specific forms described above.

Figure 2:
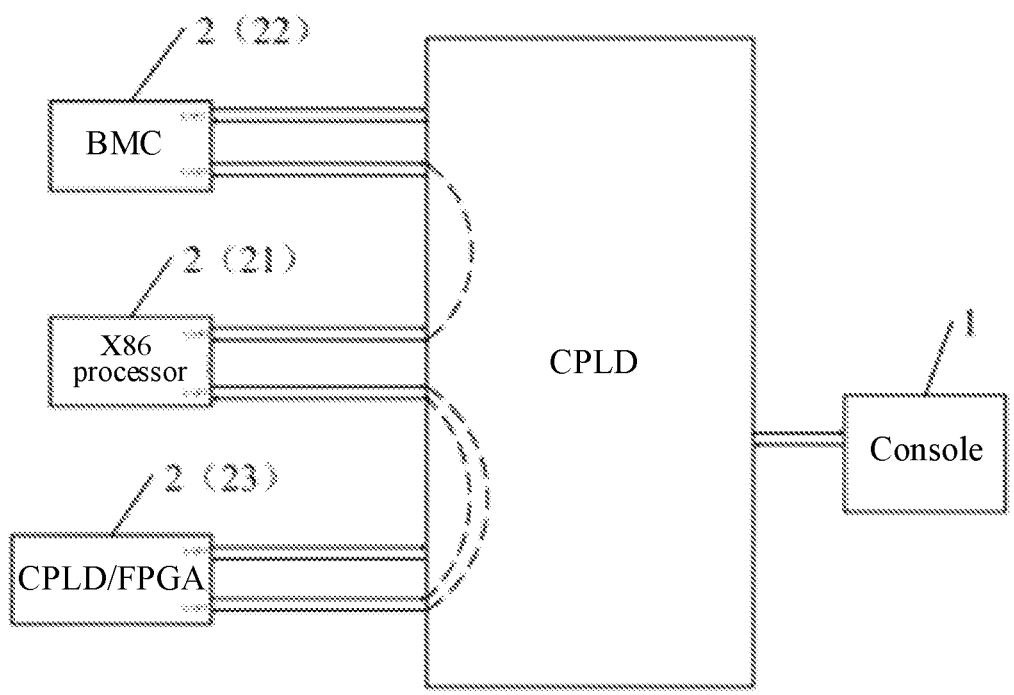
FIG. 2 is a schematic structural diagram of a serial port control system based on a CPLD according to another embodiment of the present application.

Referring to FIG. 2, in some embodiments, information transmitted from one of the processors 2 is transmitted to another of the processors 2 through a serial port group on the CPLD.

By means of the above technical means, information transmission between the processors 2 is facilitated, functional applications of the CPLD are expanded, and for example, a serial port for sending information can be monitored through a serial port for receiving information.

Specifically, the serial port group on the CPLD is composed of a plurality of serial ports, and the plurality of processors 2 are connected to the CPLD through respective serial ports. One of the processors 2 first transmits information to the CPLD through a corresponding serial port, and then the CPLD transmits the information to one or more of the processors 2 through corresponding serial ports.

Figure 3:
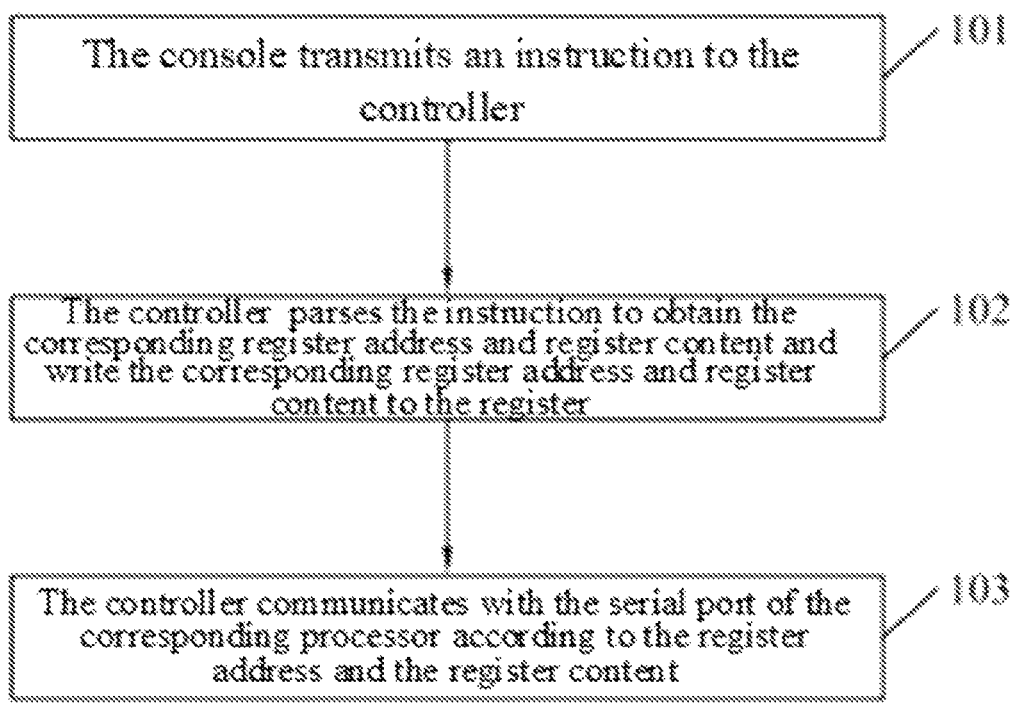
FIG. 3 is a schematic flowchart of a communication method for a serial port control system based on a CPLD according to an embodiment of the present application.

Referring to FIG. 3, the present application further provides a communication method for the serial port control system based on a complex programmable logic device (CPLD) as described above, including the following steps 101 to 103.

At 101, the console 1 transmits an instruction to the controller 31.

At 102, the controller 31 parses the instruction to obtain the corresponding register address and register content and write the corresponding register address and register content to the register 32.

At 103, the controller 31 communicates with the serial port of the corresponding processor 2 according to the register address and the register content.

In this method, the serial port can be automatically switched to communicate with the corresponding processor 2, thereby improving the efficiency.

The above disclosure gives merely preferred examples of the present application, and apparently should not be taken as limiting the scope of the present application. Therefore, equivalent changes made according to the patent scope of the present application are still covered by the present application.

What is claimed is:

1. A serial port control system based on a complex programmable logic device (CPLD), comprising:
a console;
a plurality of processors; and
a CPLD between the console and the plurality of processors, the CPLD including a controller and a register,
wherein the console is configured to transmit an instruction including a register address and a register content of a serial port of a corresponding processor to the controller;
the controller is configured to parse the instruction to obtain the corresponding register address and register content and write the corresponding register address and register content to the register;
the controller is configured to communicate with the serial port of the corresponding processor according to the register address and the register content;
the register is configured with information of a processor to be monitored, the controller is configured to transmit an instruction to the processor to be monitored through a serial port of the CPLD according to the information configured in the register, and the processor to be monitored is configured to, after receiving the instruction, return state information of the processor to the CPLD; and
the CPLD is configured to, after obtaining the state information of the processor, analyze the obtained state information and give a corresponding action instruction.

2. The serial port control system of claim 1, wherein the controller is further configured to modify a serial port mode parameter of the CPLD according to a serial port mode parameter of the corresponding processor.

3. The serial port control system of claim 2, wherein the serial port mode parameter includes a baud rate and/or a check bit.

4. The serial port control system of claim 1, wherein the console is further configured to read state information of the register.

5. The serial port control system of claim 4, wherein the state information includes a state machine and a state parameter.

6. The serial port control system of claim 1, wherein the controller is configured to obtain the state information from the processor at a preset time interval.

7. The serial port control system of claim 1, wherein the register is configured by the console and/or the processors.

8. The serial port control system of claim 1, wherein information transmitted from one of the processors is transmitted to another of the processors through a serial port group of the CPLD.

9. A communication method for a serial port control system based on a complex programmable logic device (CPLD), the serial port control system comprising a console, a plurality of processors, and a CPLD between the console and the plurality of processors, the CPLD including a controller and a register, the communication method comprising:
transmitting, by the console, an instruction including a register address and a register content of a serial port of a corresponding processor to the controller;
parsing the instruction by the controller to obtain the corresponding register address and register content and write the corresponding register address and register content to the register;
communicating with the serial port of the corresponding processor by the controller according to the register address and the register content;
transmitting, by the controller, an instruction to a processor to be monitored through a serial port of the CPLD according to information of the processor to be monitored configured in the register;

returning, by the processor to be monitored, state information of the processor to the CPLD after receiving the instruction; and analyzing, by the CPLD, the obtained state information and give a corresponding action instruction after obtaining the state information of the processor.

\* \* \* \* \*